United States Patent [19]

Kovalenko et al.

[11] 4,280,293

[45] Jul. 28, 1981

[54] STATIONARY DISPLAY MEMBER FOR A ROTATING HUB CAP

[76] Inventors: Eugene N. Kovalenko, 461 Peralta, Long Beach, Calif. 90803; John G. Bowen, 11521 Heathcliff Dr., Santa Ana, Calif. 92705

[21] Appl. No.: 106,703

[22] Filed: Dec. 26, 1979

[51] Int. Cl.³ .............................................. G09F 21/04
[52] U.S. Cl. ....................................... 40/587; 40/591; 301/37 N
[58] Field of Search ................ 40/587, 588, 589, 590, 40/591, 606, 607, 613, 617, 439, 440; 301/37 N

[56] References Cited

U.S. PATENT DOCUMENTS

| | | | |
|---|---|---|---|
| 2,130,220 | 9/1938 | Ball et al. | 40/587 |
| 2,869,262 | 1/1959 | Lucas | 40/587 |
| 2,954,629 | 10/1960 | Matin | 40/587 |
| 3,119,588 | 1/1964 | Keats | 40/606 X |
| 3,918,186 | 11/1975 | Gray | 301/37 N |

*Primary Examiner*—John F. Pitrelli
*Assistant Examiner*—G. Lee Skillington
*Attorney, Agent, or Firm*—Keith D. Beecher

[57] ABSTRACT

A stationary display member which is mounted on the rotating hub cap of a wheel of a vehicle, such as an automobile, or other rotating member, is provided, which comprises a disc-like member coaxially mounted on the hub cap to be freely rotatable about the axis of rotation of the hub cap. The disc-like member has an internal chamber which is partially filled with a flowable material, such as mercury. The flowable material collects at the bottom of the chamber, and it forms an off-set weight which prevents the disc-like member from turning as the hub cap turns about is axis of rotation. A damping device is included in the chamber which coacts with the flowable material, and which damps out any tendency for the disc-like member to oscillate about the axis of rotation of the hub cap. An appropriate insignia, design, message, or other inscription, is imprinted or attached to the outer face of the disc-like member and which remains stationary as the hub cap rotates.

8 Claims, 3 Drawing Figures

U.S. Patent
Jul. 28, 1981
4,280,293
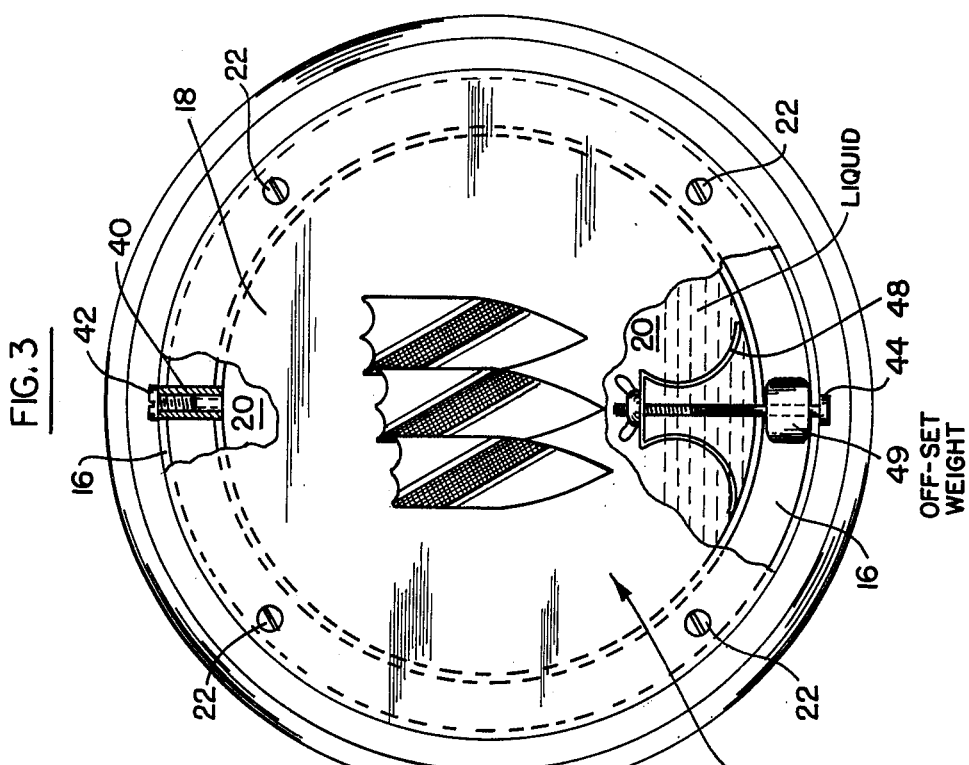
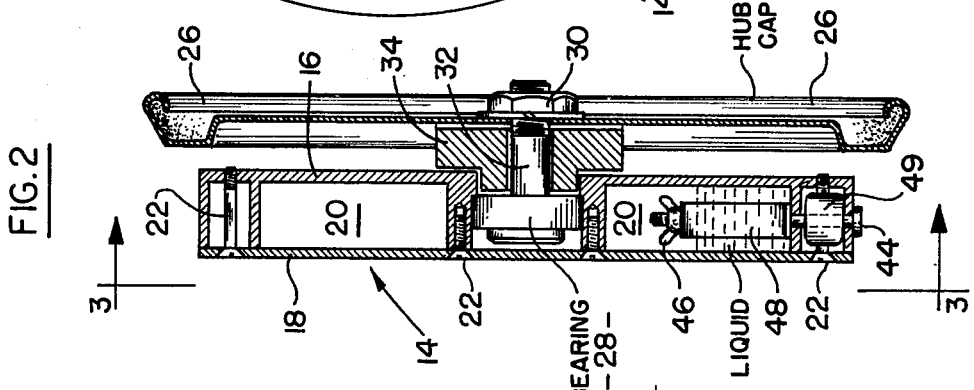
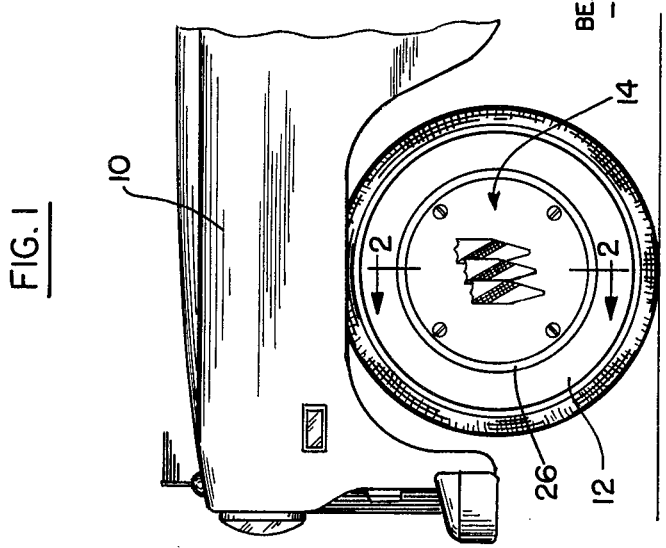

STATIONARY DISPLAY MEMBER FOR A ROTATING HUB CAP

BACKGROUND

Stationary hub cap covers which are mounted on the hub caps of the wheels of an automobile, or other vehicle, in such a manner that they remain in a stationary, non-rotating position, while the wheels and hub caps of the vehicle rotate, are known to the art. Such covers permit inscriptions, names, monograms, designs, and the like, to be attached or inscribed on their outer surface to be readily visible and to remain in a stationary upright position, notwithstanding the rotation of the wheels and hub caps of the vehicle.

However, a disadvantage in the prior art assemblies of the type described in the preceding paragraph is their lack of stability, and their tendency to oscillate about the axis of rotation of the hub caps on which the assemblies are mounted. An objective of the present invention is to provide an improved assembly of the type under consideration, and one which remains absolutely stationary as the hub cap on which it is mounted rotates, and which does not exhibit any tendency to oscillate about the axis of rotation of the hub cap.

BRIEF DESCRIPTION OF THE DRAWING

FIG. 1 is a fragmentary view of an automobile, showing one of the front wheel of the automobile, on which an assembly constructed in accordance with the concepts of the present invention is coaxially mounted;

FIG. 2 is a sectional view of the assembly taken along the line 2—2 of FIG. 1, and on an enlarged scale; and FIG. 3 is a front view of the assembly of FIG. 2, taken along the line 3—3 of FIG. 2, and partially broken away to reveal certain internal components of the assembly.

DETAILED DESCRIPTION OF THE ILLUSTRATED EMBODIMENT

As shown in FIG. 1, an automobile 10 has a front wheel 12 on which the non-rotating assembly of the invention is mounted coaxial with the axis of rotation of the wheel. The assembly includes a disc-like member 14 which forms a casing for the internal components of the assembly. As shown in FIG. 2, the member 14 has a disc-like configuration, and it includes a base portion 16, and a cover 18 which cooperate to define an internal chamber 20.

The cover 18 is attached to the base by a series of screws such as screws 22. The disc-like member 14 is rotatably mounted on a hub cap 26 by means, for example, of a bearing 28, the bearing being supported on the hub cap by means of a nut 30 which is threaded to a bolt 32, the bolt extending through a bushing 34. The hub cap 26 is mounted on the wheel 12 of the automobile of FIG. 1 in usual manner, and the disc-like member 14 is mounted on the hub cap coaxially with the axis of rotation of the hub cap and wheel, with the member 14 being freely rotatable with respect to the axis.

As shown in FIG. 3, a quantity of flowable material, such as mercury may be introduced into the chamber 20 through a fill tube 40, the fill tube being normally closed by means of a cover screw 42. The flowable material engages a damping assembly which is mounted within the chamber adjacent to the peripheral edge of the chamber by means of a screw 44 and wing nut 46. The damper, in the illustrated embodiment, is in the form of a strip 48 of metal which is configured to exhibit two back-to-back arcuate sections and which acts as a baffle to coact with the flowable material within the chamber 20. It is obvious that the damper may have other configurations.

A weight 49 is mounted in the chamber by screw 44. The weight assures that the casing will always assume the position shown in FIGS. 1, 2 and 3.

An appropriate inscription may be formed on the outer face of the disc-like member 14, as shown in FIGS. 1 and 3. When the wheel on which hub cap 26 is mounted rotates, the disc-like member 14 remains stationary, and does not rotate with the wheel. This is because the flowable material with chamber 20 acts together with off-set weight to prevent the disc-like member 14 from rotating. Also, the damper formed by strip 48 prevents any tendency for the disc-like member 48 to oscillate about the axis of rotation, and assures that the member will remain absolutely stationary as the wheel rotates.

Although the assembly of the invention is shown as mounted on the wheel of a vehicle, it may also be mounted on other rotating devices. Therefore, it will be appreciated that although a particular embodiment of the invention has been shown and described, modifications may be made. It is intended in the claims to cover the modifications which come within the true spirit and scope of the invention.

What is claimed is:

1. A non-rotating assembly for a rotatable member comprising: a disc-like member forming an internal chamber for receiving a flowable material; bearing means mounting the disc-like member on the rotatable member in coaxial relationship with the axis of rotation thereof to permit the disc-like member to be freely rotatable about the axis of rotation; a quantity of flowable material received in the chamber to act as a counterweight so as to prevent the disc-like member from rotating as the rotatable member rotates; and damping means mounted in the chamber coacting with the flowable material therein to prevent any tendency for the member to oscillate about the axis of rotation of the rotatable member.

2. The non-rotating assembly defined in claim 1, in which said flowable material is mercury.

3. The non-rotating assembly defined in claim 1, in which said damping means comprises a baffle mounted adjacent to the inner peripheral edge of the chamber and extending inwardly with respect to said inner peripheral edge at a particular angular position within the chamber.

4. The non-rotating assembly defined in claim 3, in which said baffle is formed of a strip of material configured to exhibit back-to-back arcuate sections.

5. The non-rotating assembly defined in claim 3, and which includes a weight mounted in said chamber at said particular angular position therein.

6. The non-rotating assembly defined in claim 1, and which includes a weight mounted in said chamber at a particular angular position in said chamber.

7. The non-rotating assembly defined in claim 1, in which said rotatable member is a wheel of a vehicle.

8. The non-rotating assembly defined in claim 7, in which said wheel has a hub cap, and in which said assembly is mounted on said hub cap.

* * * * *